(12) United States Patent
Weissinger et al.

(10) Patent No.: US 9,780,581 B2
(45) Date of Patent: *Oct. 3, 2017

(54) PORTABLE RECHARGEABLE BATTERY PACK AND EXTERNAL ADAPTER FOR SAME

(71) Applicant: MOTOROLA SOLUTIONS, INC, Schaumburg, IL (US)

(72) Inventors: Frederick J. Weissinger, Duluth, GA (US); Warren B. Albert, Watkinsville, GA (US); Donald L. Flowers, Dacula, GA (US); Charles W. Friedli, Lawrenceville, GA (US); John E Herrmann, Suwanee, GA (US); Viranga L. Wijeratne, Duluth, GA (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 309 days.

This patent is subject to a terminal disclaimer.

(21) Appl. No.: 14/638,643

(22) Filed: Mar. 4, 2015

(65) Prior Publication Data

US 2015/0180245 A1 Jun. 25, 2015

Related U.S. Application Data

(63) Continuation of application No. 13/665,400, filed on Oct. 31, 2012, now Pat. No. 9,276,421.

(51) Int. Cl.
*H02J 7/00* (2006.01)
*H01M 2/20* (2006.01)
(Continued)

(52) U.S. Cl.
CPC ............ *H02J 7/0031* (2013.01); *H01M 2/20* (2013.01); *H01M 10/425* (2013.01);
(Continued)

(58) Field of Classification Search
None
See application file for complete search history.

(56) References Cited

U.S. PATENT DOCUMENTS 5,504,411 A   4/1996   McCaleb et al.
5,592,064 A   1/1997   Morita
(Continued)

FOREIGN PATENT DOCUMENTS

EP   2 131 412 A2   12/2009
EP   2 355 300 A2   8/2011
(Continued)

OTHER PUBLICATIONS

International Search Report and Written Opinion for corresponding International Patent Application No. PCT/US2013/066007, dated Jan. 24, 2014.

(Continued)

*Primary Examiner* — Jared Fureman
*Assistant Examiner* — James Evans
(74) *Attorney, Agent, or Firm* — Barbara R. Doutre; Scott M. Garrett

(57) ABSTRACT

Embodiments include a portable rechargeable battery pack, system, and external adapter that allow the portable rechargeable battery pack to both power a host device though a set of host contacts and provide power through a set of charging contacts. The portable rechargeable battery pack includes a charge protection circuit that prevents an excessive discharge current through the charging contacts and allows high charge current when charging the portable rechargeable battery pack. A discharge circuit allows a low level discharge current through the charging contacts to provide power to other devices.

3 Claims, 4 Drawing Sheets

(51) Int. Cl.
*H01M 10/42* (2006.01)
*H01M 2/30* (2006.01)
*H01M 2/34* (2006.01)
*H01M 10/46* (2006.01)

(52) U.S. Cl.
CPC .......... *H02J 7/0026* (2013.01); *H02J 7/0045* (2013.01); *H02J 7/0072* (2013.01); *H01M 2/30* (2013.01); *H01M 2/34* (2013.01); *H01M 10/46* (2013.01); *H01M 2220/30* (2013.01); *H02J 2007/004* (2013.01); *H02J 2007/0039* (2013.01)

(56) References Cited

U.S. PATENT DOCUMENTS

| | | |
|---|---|---|
| 5,644,211 A | 7/1997 | Tokuyama |
| 5,738,954 A | 4/1998 | Latella et al. |
| 5,826,958 A | 10/1998 | Avitan |
| 5,963,019 A | 10/1999 | Cheon |
| 6,392,387 B1 | 5/2002 | Sage et al. |
| 6,414,465 B1 | 7/2002 | Banks et al. |
| 6,914,415 B2 | 7/2005 | Bohne et al. |
| 7,068,012 B1 | 6/2006 | Geren et al. |
| 7,145,313 B2 | 12/2006 | Geren et al. |
| 7,629,766 B2 | 12/2009 | Sadow |
| 7,659,692 B2 | 2/2010 | Sainomoto et al. |
| 8,035,346 B2 | 10/2011 | Tsai |
| 8,044,814 B2 | 10/2011 | Bruce et al. |
| 8,098,051 B2 | 1/2012 | Litingtun et al. |
| 8,148,946 B2 | 4/2012 | Takeda et al. |
| 9,337,667 B2 * | 5/2016 | Arendell ............ H01M 2/1005 |
| 2004/0017177 A1 | 1/2004 | Santana, Jr. |
| 2004/0116164 A1 | 6/2004 | Beguet et al. |
| 2005/0073282 A1 | 4/2005 | Carrier et al. |
| 2006/0199435 A1* | 9/2006 | Foo ....................... H01R 27/00 439/638 |
| 2007/0072474 A1 | 3/2007 | Beasley et al. |
| 2007/0105010 A1 | 5/2007 | Cassidy |
| 2009/0051316 A1 | 2/2009 | Park et al. |
| 2009/0115372 A1 | 5/2009 | Naganuma et al. |
| 2010/0129700 A1 | 5/2010 | Tanno |
| 2010/0321871 A1 | 12/2010 | Diebel et al. |
| 2011/0095707 A1 | 4/2011 | Mehta |
| 2011/0204843 A1 | 8/2011 | Foster |
| 2011/0248676 A1 | 10/2011 | Kim |
| 2012/0052337 A1 | 3/2012 | Krishnamurthi et al. |
| 2012/0057259 A1 | 3/2012 | Yang et al. |
| 2013/0002026 A1 | 1/2013 | Mizutani et al. |
| 2013/0082543 A1 | 4/2013 | Tang |
| 2014/0117784 A1* | 5/2014 | Weissinger, Jr. ..... H02J 7/0026 307/150 |
| 2014/0239895 A1 | 8/2014 | Arendell |

FOREIGN PATENT DOCUMENTS

| | | |
|---|---|---|
| EP | 2 416 469 A1 | 2/2012 |
| EP | 2 463 985 A1 | 6/2012 |
| EP | 2 506 341 A2 | 10/2012 |
| GB | 2 386 267 A | 9/2003 |

OTHER PUBLICATIONS

International Search Report and Written Opinion for corresponding International Patent Application No. PCT/US2014/016675, dated Oct. 14, 2014.
Non-Final Office Action dated Dec. 5, 2014, in U.S. Appl. No. 13/665,400, Weissinger, F. J. et al., filed Oct. 31, 2012.
Notice of Allowance dated Apr. 13, 2015, in U.S. Appl. No. 13/665,400, Weissinger, F. J. et al., filed Oct. 31, 2012.
Ex Parte Quayle Action dated Oct. 6, 2015, in U.S. Appl. No. 13/781,103, Arendell, S. J., filed Feb. 28, 2013.

* cited by examiner

PORTABLE RECHARGEABLE BATTERY PACK AND EXTERNAL ADAPTER FOR SAME

The present application is a continuation application of U.S. patent application Ser. No. 13/665,400 filed in the United States Patent Office on Oct. 31, 2012, the entire contents of which is incorporated herein by reference.

FIELD OF THE DISCLOSURE

The present disclosure relates generally to portable rechargeable battery packs, and more particularly to portable rechargeable battery packs that have both charging contacts and host contacts where the charging contacts have a charge protection means to prevent discharge current being drawn from the charging contacts but through which a charge current can flow, and further to providing power from the portable rechargeable battery pack though the charging contacts via an external adapter.

BACKGROUND

Portable rechargeable battery packs are used to power portable devices, particularly portable devices that are in frequent use and use a significant amount of power. For example, portable communication devices, such as cellular phones and portable two-way radios are typically left on so as to be able to receive communications at any time while in use. Such constant power consumption makes the use of primary battery cells (e.g. non-rechargeable) uneconomical, and in such cases the use of rechargeable battery cells is much more cost efficient.

Many portable rechargeable battery packs are designed to be charged while attached to a device powered by the portable rechargeable battery pack, as well as alone (not attached to a device). Accordingly, it is conventional for a portable rechargeable battery pack to have two sets of contacts: a set for providing power to the host device, and a set for charging the portable rechargeable battery pack while the portable rechargeable battery pack is attached to the host device. The set of contacts used to charge the portable rechargeable battery pack can be referred to as the charging contact set, or simply referred to as charging contacts. Charging contacts can be exposed while the portable rechargeable battery pack is attached to a host device, which can expose them to undesirable conditions, such as short circuiting across the positive and negative charging contacts.

To address the issue of exposed charging contacts, portable rechargeable battery packs are typically provided with a charge protection means in the portable rechargeable battery pack that prevents electric current from discharging through the charging contacts, while also being operable to allow a charging current when the portable rechargeable battery pack is being recharged. For example, it is common to place a diode in series between the positive charging contact and the rechargeable battery cell(s) inside the portable rechargeable battery pack to allow charging current into the portable rechargeable battery pack and block current from discharging through the charging contacts.

There has been a continuing demand for portable devices, and hence the need for portable power. Accessories and other devices are presently available which do not need a conventional AC to DC adapter, but do not have their own power source. For example, there are a number of devices that can be powered from a computer, such as a laptop computer, via a universal serial bus (USB) of the computer. Unfortunately, because of the charge protection circuit typically used in such battery packs, the battery packs cannot be used to power accessory devices from the charging contacts.

Accordingly, there is a need for portable rechargeable battery pack, system, and external adapter that allows powering of devices through the charging contacts but without significantly compromising the safety of charge protection at the charging contacts of a portable rechargeable battery pack.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
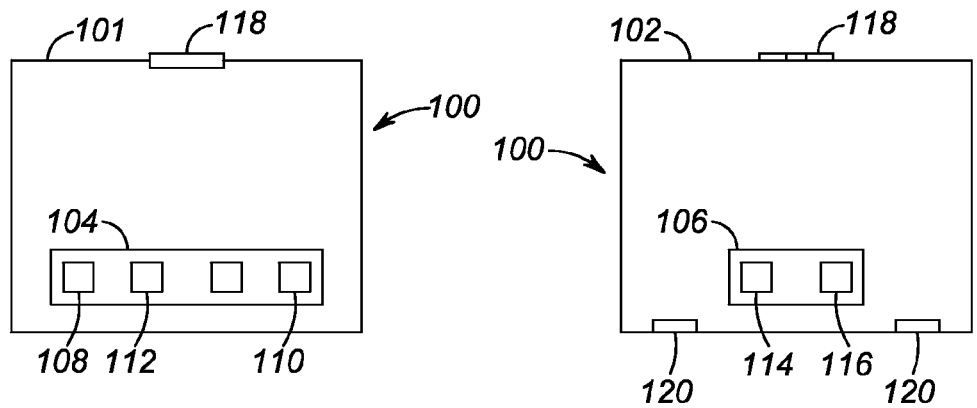
FIG. 1 shows opposing views of a portable rechargeable battery pack in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments include a portable rechargeable battery pack that includes least one rechargeable cell disposed in the portable rechargeable battery pack and a set of host contacts disposed on the battery pack that are configured to provide power from rechargeable cell(s) to a host device coupled to the battery pack. The portable rechargeable battery pack also comprises a set of charging contacts, including a power contact, disposed on the battery pack via which a charging current can be applied to the rechargeable cell(s). The portable rechargeable battery pack can further include a charge protection circuit element coupled between the at least one rechargeable cell and the power contact that is operable to prevent discharge of the rechargeable cell(s) through the set of charging contacts while also able to allow charging currents to flow into the cells through the charging contacts. The portable rechargeable battery pack can further include a discharge circuit having at least one circuit element coupled in parallel with the charge protection circuit element that is operable to allow a discharge current through the power contact.

FIG. 1 shows a first side 101 and an opposing second side 102 of a portable rechargeable battery pack 100 in accordance with some embodiments. First side 101 can be the back of the portable rechargeable battery pack and second side 102 can be the side of the portable rechargeable battery pack that interfaces with a host device. First side 101 can interface with a battery charger via a set of charging contacts 104 that are disposed on the first side 101. As used here there term "contact," unless otherwise indicated, refers to an electrically conductive component that is used to make physical contact with a mating electrically conductive component, and therefore provide an electrical connection. Charging contacts 104 are designed to mate with corresponding contacts of a battery charger so as to allow charging of the portable rechargeable battery pack. Accordingly, the charging contacts 104 include power contacts 108, 110, which can be positive and negative contacts, respectively. While charging, current flows from the charger into the positive power contact 108 and returns to the charger through the negative power contact 110. The charging contacts 104 can further include one or more information contacts 112 that each provide information to the charger, such as, for example, battery data and temperature information. The second side 102 comprises a set of host contacts 106 which provide power to a host device, such as a portable communication device, such as through a positive host contact 114 and a negative host contact 116. The portable rechargeable battery pack 100 can include mechanical features for attaching it to, or otherwise retaining it in a host device, such as a latch 118 and one or more retaining members 120. Although the charging contacts 104 and host contacts 106 are shown on opposing sides 101, 102 of the portable rechargeable battery pack 100, those skilled in the art will appreciate that the contacts and the portable rechargeable battery pack itself can be designed in numerous other arrangements and configurations.

In accordance with some embodiments, the portable rechargeable battery pack 100 is designed to be mounted or otherwise attached or disposed in a host device to provide power to the host device through host contacts 106 while, at the same time, the portable rechargeable battery pack and host device together can be placed in a battery charger for charging the portable rechargeable battery pack 100 through charging contacts 104. The portable rechargeable battery pack 100 contains a charge protection circuit that prevents or limits current from flowing in the opposite direction of a charging current through the charging contacts. However, the portable rechargeable battery pack 100, in accordance with embodiments, contains a discharge circuit that allows at least a limited current to be drawn from the portable rechargeable battery pack through the charging contacts 104.

Figure 2:
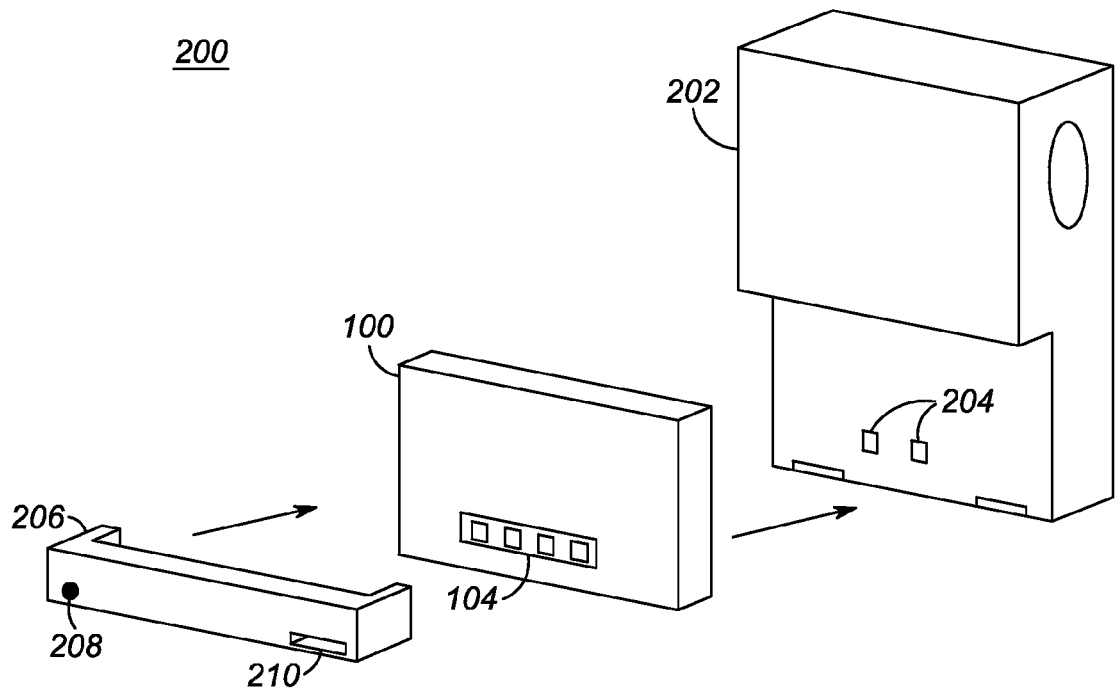
FIG. 2 is an exploded isometric view of a portable rechargeable battery pack system and a host device in accordance with some embodiments.

FIG. 2 is an exploded isometric view of a portable rechargeable battery pack system 200 in accordance with some embodiments. The portable rechargeable battery pack 100 is shown, and can be mounted on or otherwise attached to a host device 202, and provide power to the host device 202 through host contacts 106 (not seen in this view) which mate with corresponding host contacts 204 on the host device 202. An external adapter 206 is designed to mate with the portable rechargeable battery pack 100, and has mating contacts (not seen here) that mate with at least some of the charging contacts 104. The external adapter 206 can receive power (electric current and voltage) from the portable rechargeable battery pack 100 through the charging contacts 104, and provide power through a power connector, such as a female jack 208 or a USB connector 210. Thus, the portable rechargeable battery pack 100 can power both the host device 202 via contacts 204, and other devices via one or more power connectors 208, 210, via a discharge circuit in the portable rechargeable battery pack 100 that allows a safe discharge current through the charging contacts.

Figure 3:
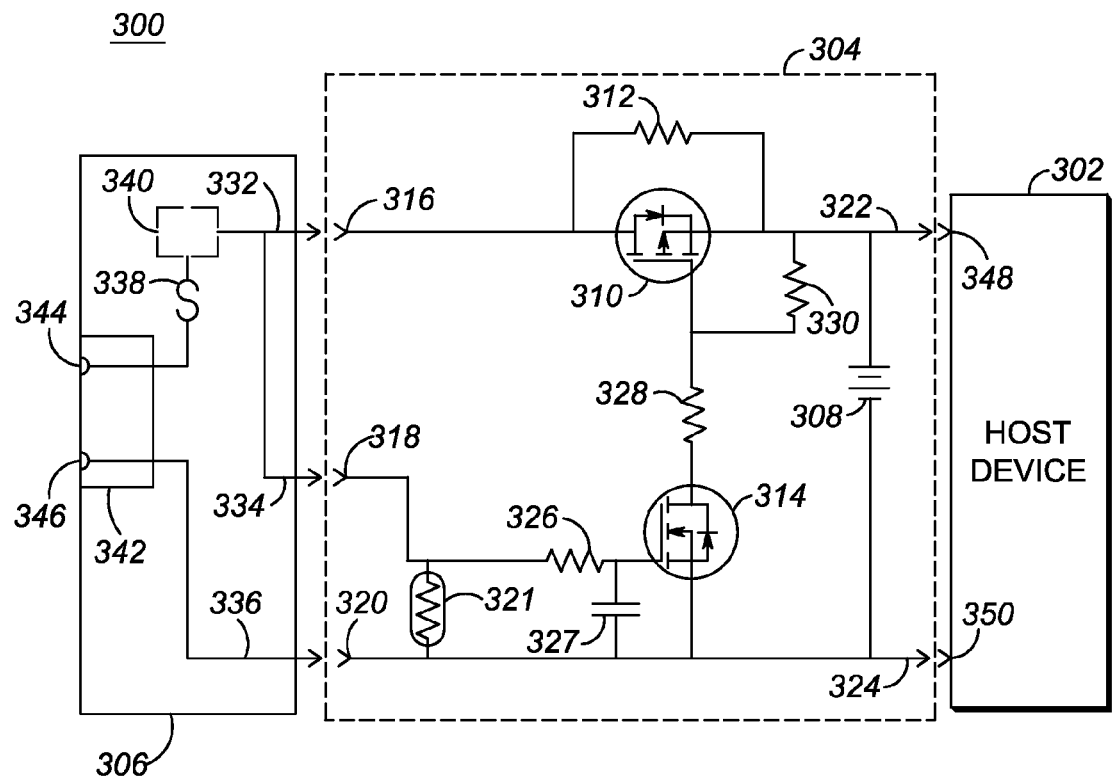
FIG. 3 is a schematic of a portable rechargeable battery pack system in accordance with some embodiments.

FIG. 3 is a schematic of a portable rechargeable battery pack system 300 in accordance with some embodiments. The schematic shows a host device 302, portable rechargeable battery pack 304, and an external adapter 306. The portable rechargeable battery pack 304 contains at least one rechargeable cell 308 that is connected between host contacts 322, 324 which mate with mating host contacts 348, 350, respectively, in the host device 302. The portable rechargeable battery pack 304 also contains a set of charging contacts 316, 318, and 320. Charging contacts 316, 320 comprise power contacts such as a positive and a negative contact. Contact 318 can be an information contacts that is, for example, connected to a thermistor 321 which can provide thermal information to a charger. The portable rechargeable battery pack 304 further contains a charge protection circuit element coupled between a power contact 316 and the rechargeable cell(s) 308, such as a transistor switch 310. As used herein, the term "charge protection circuit element" is a circuit element that allows the typically high level charge currents used to charge the rechargeable cell(s) 308 from the charging contacts, but which can, or is operable to block discharge current. The transistor switch 310 can be, for example, a P-channel metallic oxide semiconductor field effect transistor (MOSFET). The transistor switch 310 is controlled by a control switch 314, that is, for example, an N-channel MOSFET, that has a control input coupled to the information contact 318. In some embodiments the control switch 314 is connected to the information contact through a resistance 326 in some embodiments. Signal debounce on the information contact 318 can be provided by series resistor 326 and capacitor 327. The information contact is further coupled to an information element, such as thermistor 321, which can provide temperature information to a charger when the portable rechargeable battery pack 304 is connected to a charger. When the portable rechargeable battery pack 304 is coupled to a charger, a voltage on the information contact causes control switch 314 to close, pulling down the gate voltage of transistor switch 310, causing transistor switch 310 to likewise change to a closed or low impedance state, allowing a high charge current into the portable rechargeable battery pack 304 to charge the rechargeable cell 308. The control switch 314 is connected to, for example, the gate of transistor switch 310. A pull up resistance 330 can operate to pull up the gate voltage when control switch 314 is open, resulting in transistor switch 310 being open. As used herein, the term "open" when used with regard to a switch element refer to an open circuit condition where the impedance of the device is sufficiently high as to be regarded as an open circuit. Likewise, the term "closed" when used in regard to a switch element means a closed or "short" circuit condition where the impedance of the switch element is so low as to be regarded as a closed switch. The portable rechargeable battery pack 304 further comprises a resistance 312 coupled in parallel with the transistor switch 310. The resistance 312 is a bias resistance and allows voltage of the rechargeable cell 308 to reach the power contact 316.

The external adapter 306 includes mating charging contacts 332, 334, and 336 that mate with charging contacts 316, 318, and 320, respectively, of the portable rechargeable battery pack 304. The external adapter 306 further includes a power connector 342 that provides power to external device via, for example, a positive connector lead 344 and a negative connector lead 346. Power is provided to the power connector 342 by a circuit coupled between the power connector 342 and the mating power contact 332, that can include, for example, a fuse device 338. The fuse device is a current limiting circuit, such as a regulator, or a positive temperature coefficient (PTC) polymer switch, or a simple fuse. The circuit between the power connector 342 and the mating power contact 332 can further include a soft start circuit 340. When the external adapter 306 is coupled to the portable rechargeable battery pack 304, the voltage provided to the power contact 316, and thus to mating power contact 332 by resistance 312 is fed to mating information contact 334, and thus to information contact 318, causing control switch 314 to close, in turn causing transistor switch 310 to close. When transistor switch 310 closes, current flows from the rechargeable cell(s) 308 to the external adapter 306. The soft start circuit 340, when present, can have a delayed switch circuit that ensures voltage from the mating power contact 332 causes control switch 314 to close before a load coupled to the power connector 324 can pull the voltage at the mating power contact low, preventing the control switch 314 from closing.

As used herein, the term "discharge circuit" refers to those circuit elements that facilitate the safe discharge of current through the charging contacts. The discharge circuit and the charge protection circuit can share circuit elements. In FIG. 3 the discharge circuit includes resistors 312, 326, 330, control switch 314, and transistor switch 310. Even though transistor switch 310 is closed discharging in FIG. 3, it is only able to occur by virtue of the external adapter coupling the voltage at the power contact 316 to the information contact 318. Thus, a short between contacts 316 and 320 would not necessarily cause control switch 314 to close, and transistor switch 310 would remain open, blocking discharge current.

Figure 4:
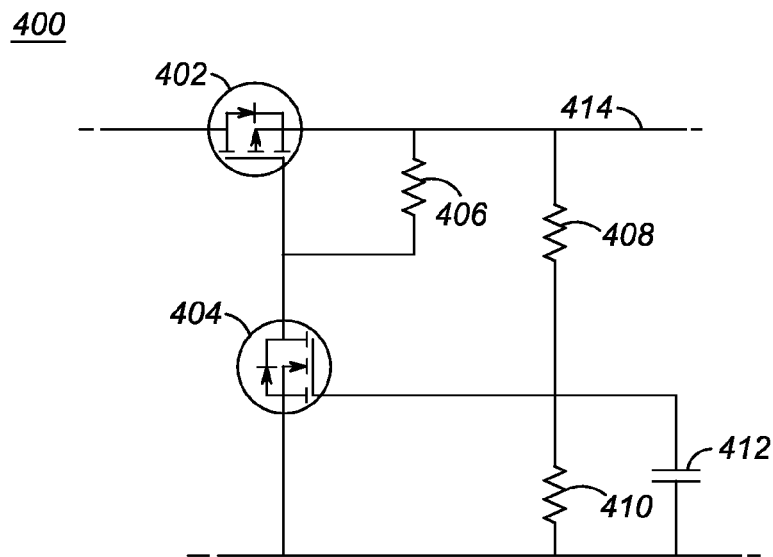
FIG. 4 is a schematic of a soft start circuit in accordance with some embodiments.

FIG. 4 is a schematic of a soft start circuit 400 in accordance with some embodiments. The soft start circuit 400 is used as soft start circuit 340 of FIG. 3. The soft start circuit 400 includes a P-channel MOSTFET 402 that is coupled between the mating power contact 332 and positive connector lead 344 (or fuse 338). A pull up resistance 406 is coupled between the gate and source of the MOSFET 402. An N-channel MOSFET 404 is used to control the P-channel MOSFET 402, and is itself controlled by a time delay circuit comprised of a voltage divider of resistances 408, 410, and a capacitor 412 coupled in parallel with the lower resistor 410 of the resistor divider. Accordingly, when voltage is first applied to the mating power contact, which is coupled to line 414, the capacitor 412 will begin to charge, as determined by the effective RC time constant of resistors 408, 410 and the capacitance of capacitor 412. Eventually the voltage will rise to a level high enough to cause the N-channel MOSFET 404 to close, in turn causing P-channel MOSFET to close and allow current to flow from the mating power contact coupled to line 414 to the power connector (e.g. 342). The soft start circuit 400 is one example of a time delayed switch circuit, and other variations and arrangements may occur to those skilled in the art.

Figure 5:
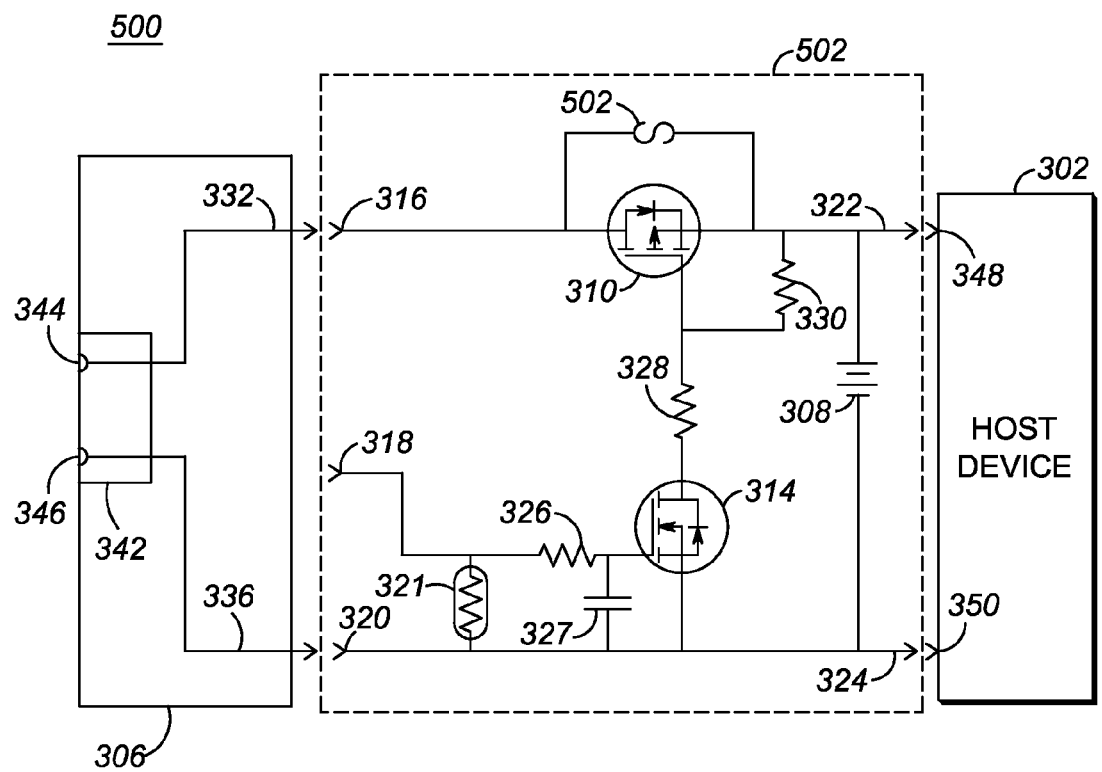
FIG. 5 is a schematic of a portable rechargeable battery pack system in accordance with some embodiments.

FIG. 5 is a schematic of a portable rechargeable battery pack system 500 in accordance with some embodiments. The portable rechargeable battery pack system 500 shows discharge circuit in accordance with some embodiments. Whereas in FIG. 3, a resistance (312) was coupled in parallel with the charge protection circuit (e.g. transistor switch 310), here a PTC polymer switch 502 is coupled in parallel with the charge protection circuit. The PTC switch 502 is a polymeric positive temperature coefficient device and generally allows the free flow of electrical current up to a threshold current level, at which point the PTC polymer switch transitions from a very low resistance to a high resistance (e.g. effectively an open circuit). Thus, PTC polymer switch 502 acts as a current limiter and allows enough current to flow from the rechargeable battery cell(s) 308 to the power contact 316 to power a device via the external adapter 306, and limits the current in a resettable fuse manner to prevent an unnecessarily high current level to flow out of the charging contacts without interfering with powering the host device. The trip current level of the PTC polymer switch 502 can be on the order of 100-200 milliamps. Accordingly, external adapter 306 does not require the functionality of the fuse 338 or soft start circuit 340. In the present exemplary schematic, information contact 318 does not need to be used, although it is still present for use with a battery charger so as to be able to close transistor switch 310 as described with reference to FIG. 3. In embodiments according to FIG. 5, the charge protection circuit includes the transistor switch 310 and the discharge circuit includes the PTC polymer switch 502.

Figure 6:
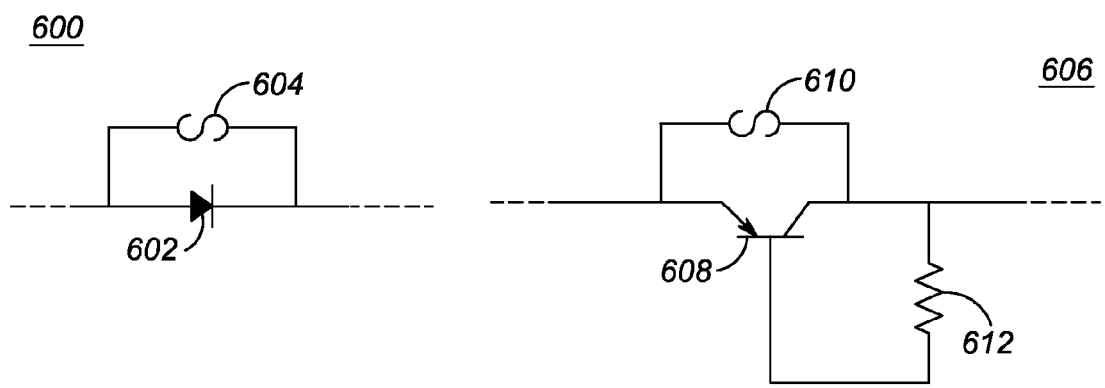
FIG. 6 shows schematics of charge protection circuits in accordance with some embodiments.

FIG. 6 shows schematics of charge protection circuits 600, 606 in accordance with some embodiments. Circuit 600 shows the use of a diode 602 to prevent excess discharge current. The diode 602 can replace transistor switch 310 in some embodiments. The diode 602 acts as the charge protection circuit while the PTC polymer switch 604, coupled in parallel with the diode 602, acts as the discharge circuit. The PTC polymer switch 604, while being bi-directional (e.g. allows current in both directions), has a trip current level that is significantly below a desired charge current level. Hence, when charging, charge current can pass through the diode 602, and when the portable rechargeable battery pack is used to power external device via the charging contacts (e.g. though external adapter 306), the discharge current can flow through PTC polymer switch 604. Circuit 606 is similar but instead of a diode it uses a diode-connected bipolar junction (BJT) transistor 608. The BJT 608 can be a PNP transistor, having its base coupled to its collector terminal via resistor 612. When so connected, the BJT 608 operates substantially like diode 602. A benefit of the circuits 600, 606 is that they do not need additional circuitry to switch them on or off, as with MOSFET transistor switch 310, and they can be less expensive. Due to the voltage drop of around 0.7 volts, circuits 600, 606 are more suitable for applications using a lower charge current than applications which require a MOSFET.

Figure 7:
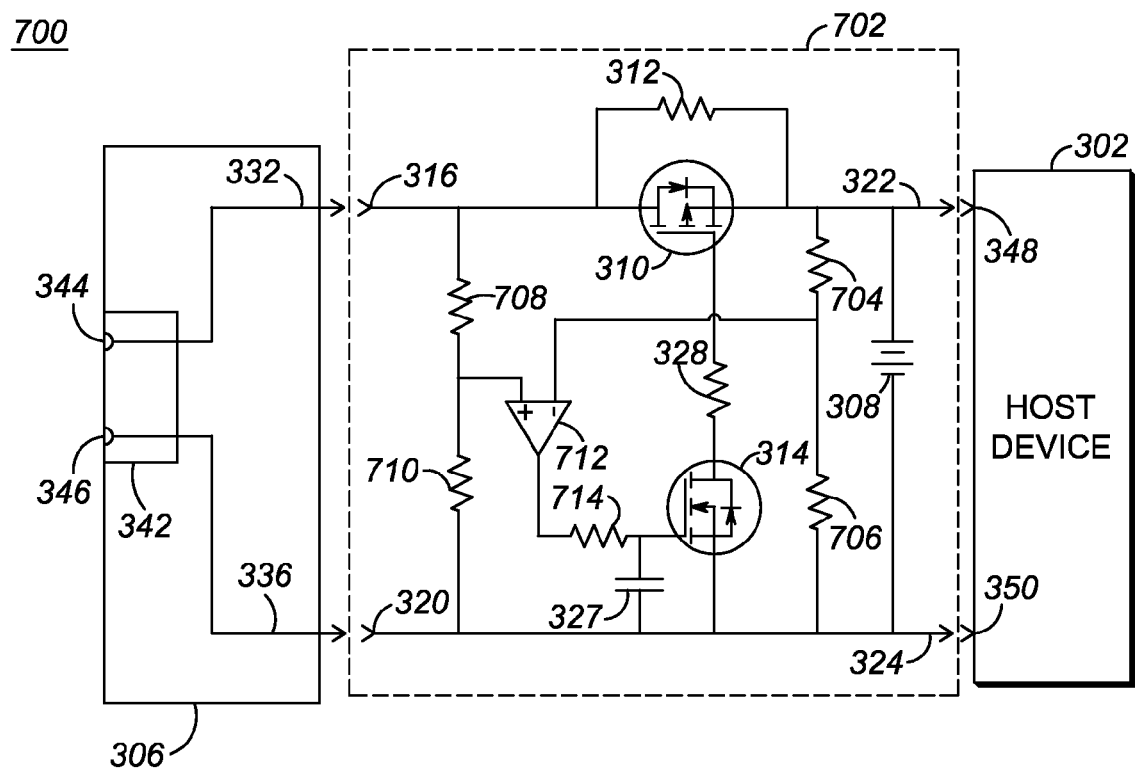
FIG. 7 is a schematic of a portable rechargeable battery pack system in accordance with some embodiments.

FIG. 7 is a schematic of a portable rechargeable battery pack system 700 in accordance with some embodiments. In the present schematic, transistor switch 310 is normally closed (low impedance). When a load is attached to the charging contacts that would draw current through the charging contacts 316, 320 in the discharge direction, the transistor switch 310 is opened (high impedance) until the load is removed. Thus, the switch transistor 310, as in FIG. 3, plays a role in both the charge protection and the discharge circuits. The control is provided by a cell side resistor divider 704, 706, a load side resistor divider 708, 710, a bias resistor 312 coupled in parallel with the switch transistor 310, and a comparator 712 which samples the divided voltages provided by the cell side resistor divider 704, 706 and the load side resistor divider 708, 710, and provides an output to control switch 314. The cell side resistor divider is coupled in parallel with the rechargeable cell(s) 308 on the host side of the transistor switch 310. The load side resistor divider 708, 710 is coupled between the power contacts 316, 320 of the charging contacts. While the switch transistor 310 can be switched to a low impedance, on the order of tenths of an ohm, or lower, it does have a determinable "on" resistance. The resistor dividers 704, 706 and 708, 710 are selected so that, with no load on the charging contacts (e.g. a discharge current), the comparator 712 provides a "high" output, causing control switch 314 to be closed, pulling down the gate voltage of transistor switch 310, thereby causing transistor switch 310 to be closed. Thus, when there is no load, the voltage sampled by the comparator 712 from the load side resistor divider 708, 710 will be higher than the voltage sampled from the cell side resistor divider 704, 706. When a charge current is applied through the charging contacts 316, 320, the voltage on the load side resistor divider will rise slightly due to the on resistance of the transistor switch 310. However, when a discharge current is provided through transistor switch 310 through the charging contacts, the on resistance of the transistor switch 310 will cause the voltage on the load side resistor divider 708, 710 to drop below the voltage provided by the cell side resistor divider 704, 706, and when it drops far enough, such as due to an excessive load (or short circuit), the output of the comparator will switch from "high" to "low," causing the control switch 314 to open (high impedance), resulting in the gate voltage of the transistor switch 310 to rise, causing it to open as well. While the excessive load remains, the voltage on the load side resistor divider 708, 710 will remain substantially below the voltage evident at the cell side resistor divider 704, 706, which will keep the output of the comparator 712 low and transistor switch 310 open, thus blocking any significant discharge current out of the portable rechargeable battery pack 702 through the charging contacts. The output of the comparator 712 is integrated via a series resistor 714 and capacitor 327 to prevent signal "bounce" as the voltages sampled by the comparator change past each other. In embodiments according to FIG. 7, the charge protection circuit includes the transistor switch 310 and the discharge circuit also includes the transistor switch 310 and also the cell side resistor divider 704, 706, the load side resistor divider 708, 710, the comparator 712, and control switch 314.

Embodiments as described here allow the use of a portable rechargeable battery pack that has charge protection to provide a useful amount of power through the charging contacts (and the host contacts) while retaining protection against an undesirably high discharge current. Thus, accessory devices and other devices can be powered by a portable rechargeable battery pack even while the battery pack is attached to, and powering, a host device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A portable power system, comprising:
   a portable rechargeable battery pack having a set of host contacts on one side surface and a set of charging contacts on another side surface;

a host device being powered by the portable rechargeable battery pack via corresponding host contacts mating with the set of host contacts of the portable rechargeable battery pack;

an external adapter coupled to the portable rechargeable battery pack;

an external device coupled to the external adapter; and the external adapter reconfiguring the charging contacts of the portable rechargeable battery pack into a power source for powering the external device.

2. The portable power system of claim 1, wherein the external adapter comprises:

a set of mating contacts that mate with the set of charging contacts of the portable rechargeable battery pack, the set of mating contacts including a mating power contact that mates with a power contact of the set of charging contacts of the portable rechargeable battery pack;

a power connector for powering an external device; and a circuit that couples the power connector to the set of mating contacts.

3. The portable power system of claim 2, wherein the circuit of the external adapter comprises a soft start switch coupled between the mating power contact and the power connector.

* * * * *